(12) United States Patent
Shiraishi et al.

(10) Patent No.: US 11,710,386 B2
(45) Date of Patent: Jul. 25, 2023

(54) PROCESSING APPARATUS, AND ACCOUNTING APPARATUS

(71) Applicant: NEC Corporation, Tokyo (JP)

(72) Inventors: Soma Shiraishi, Tokyo (JP); Kota Iwamoto, Tokyo (JP); Takami Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/632,954

(22) PCT Filed: Aug. 8, 2019

(86) PCT No.: PCT/JP2019/031391
§ 371 (c)(1),
(2) Date: Feb. 4, 2022

(87) PCT Pub. No.: WO2021/024459
PCT Pub. Date: Feb. 11, 2021

(65) Prior Publication Data
US 2022/0292934 A1 Sep. 15, 2022

(51) Int. Cl.
*G07G 1/00* (2006.01)
*G06V 20/64* (2022.01)
*G07G 1/12* (2006.01)

(52) U.S. Cl.
CPC ........... *G07G 1/0063* (2013.01); *G06V 20/64* (2022.01); *G07G 1/12* (2013.01)

(58) Field of Classification Search
CPC ...... G07G 1/0063; G07G 1/12; G07G 1/0045; G06V 20/64; G06V 10/74; G06Q 20/201; G06Q 20/204; G06Q 20/208
See application file for complete search history.

(56) References Cited

U.S. PATENT DOCUMENTS

| | | | |
|---|---|---|---|
| 2006/0044635 A1* | 3/2006 | Suzuki | G06F 16/58 |
| | | | 358/448 |
| 2011/0194732 A1* | 8/2011 | Tsuji | G06V 10/993 |
| | | | 382/103 |
| 2013/0182899 A1 | 7/2013 | Naito et al. | |

(Continued)

FOREIGN PATENT DOCUMENTS

| | | |
|---|---|---|
| JP | 2013-145526 A | 7/2013 |
| JP | 2015-038720 A | 2/2015 |

(Continued)

OTHER PUBLICATIONS

International Search Report for PCT Application No. PCTJP2019/031391, dated Oct. 1, 2019.

(Continued)

*Primary Examiner* — Tuyen K Vo
(74) *Attorney, Agent, or Firm* — Sughrue Mion, PLLC

(57) ABSTRACT

The present invention provides a processing apparatus (10) including a product database management unit (11) that registers a registration target product in a product database, and a special information management unit (13) that, when a similar-appearance product being similar in appearance to the registration target product at a predetermined level or more is registered in the product database, registers both the registration target product and the similar-appearance product as first processing target products requiring first processing, and registers information associating the registration target product and the similar-appearance product.

9 Claims, 14 Drawing Sheets

(56) References Cited

U.S. PATENT DOCUMENTS

| | | | |
|---|---|---|---|
| 2015/0026017 A1 | 1/2015 | Tsunoda |
| 2016/0086149 A1 | 3/2016 | Yuyama |
| 2016/0180509 A1 | 6/2016 | Sato |
| 2016/0232757 A1 | 8/2016 | Klein |

FOREIGN PATENT DOCUMENTS

| | | |
|---|---|---|
| JP | 2016-031599 A | 3/2016 |
| JP | 2016-062545 A | 4/2016 |
| JP | 2016-115282 A | 6/2016 |
| JP | 2017-139019 A | 8/2017 |

* cited by examiner

FIG. 3

| PRODUCT DISCRIMINATION INFORMATION | PRODUCT NAME | UNIT PRICE | .... |
|---|---|---|---|
| 0013821 | NATTO DAIO (SMALL GRAIN) | 138 | .... |
| 0022238 | NATTO DAIO (LARGE GRAIN) | 138 | .... |
| ⋮ | ⋮ | ⋮ | ⋮ |

FIG. 4

| PRODUCT DISCRIMINATION INFORMATION | FEATURE VALUE | IMAGE DISCRIMINATION INFORMATION |
|---|---|---|
| 0013821 | * * * | C113,C114···· |
| ⋮ | ⋮ | ⋮ |

FIG. 5

| PRODUCT DISCRIMINATION INFORMATION | FIRST PROCESSING TARGET PRODUCT | SIMILAR-APPEARANCE PRODUCT DISCRIMINATION INFORMATION | .... |
|---|---|---|---|
| 0013821 | ✓ | 0022238 | .... |
| 0319191 | ✓ | 0101337, 2828111 | .... |
| ⋮ | ⋮ | ⋮ | ⋮ |

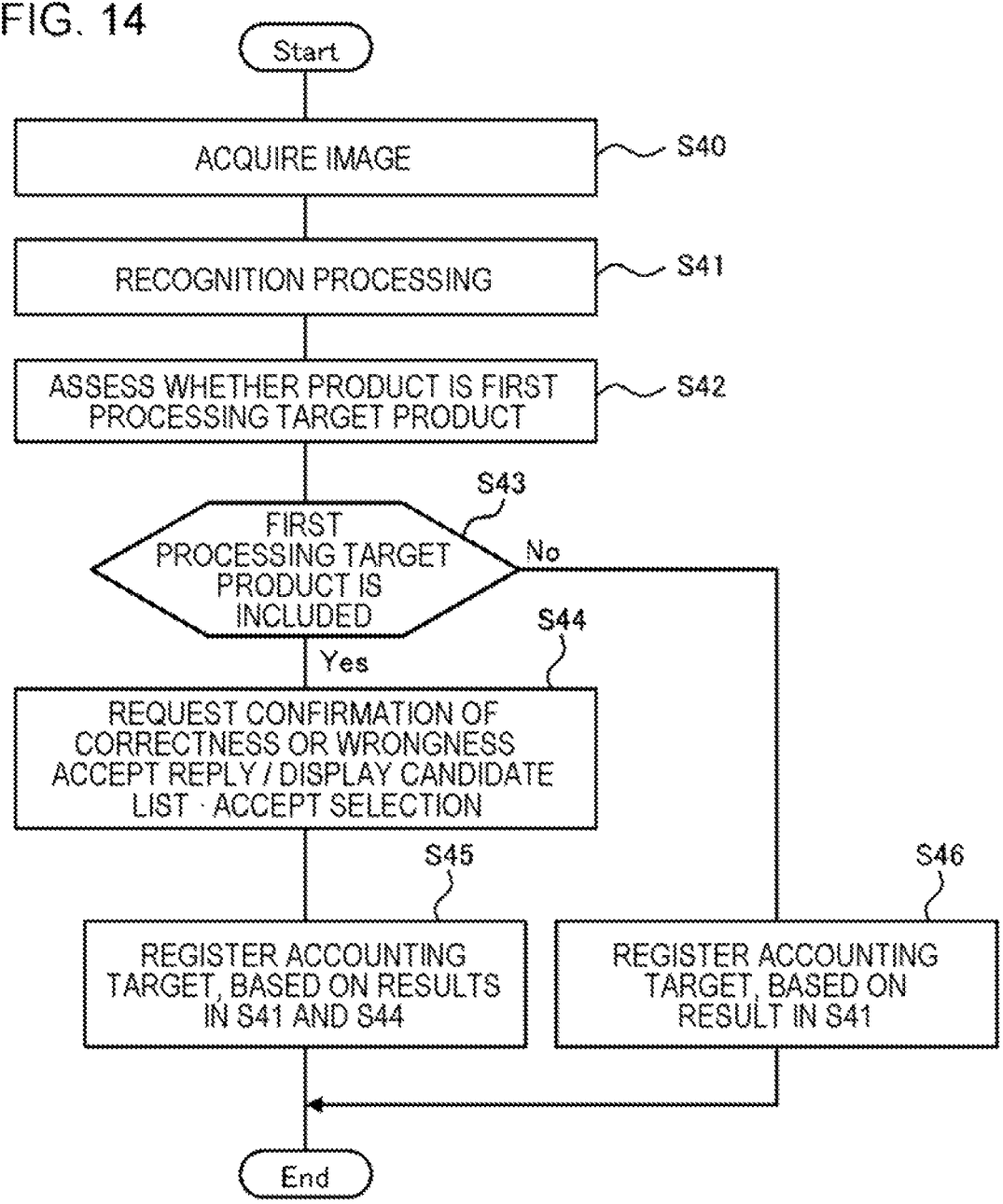

PROCESSING APPARATUS, AND ACCOUNTING APPARATUS

This application is a National Stage Entry of PCT/JP2019/031391 filed on Aug. 8, 2019, the contents of all of which are incorporated herein by reference, in their entirety.

TECHNICAL FIELD

The present invention relates to a processing apparatus, an accounting apparatus, a processing method, and a program.

BACKGROUND ART

Patent Document 1 discloses, in a technique for recognizing and registering a product being an accounting target, based on an image capturing the product being the accounting target, a technique for computing a similarity degree of appearance between an object included in the image and each of a plurality of products, and, when a plurality of products for which the computed similarity degree is equal to or more than a threshold value are present, outputting, to an operator, information inducing rotation of the object.

Patent Document discloses a technique for comparing a feature value of an article included in an image with a feature value of an article stored in a storage unit, computing a similarity degree for each article stored in the storage unit, and reporting, based on a computed result, update of a feature value of a product stored in the storage unit.

RELATED DOCUMENT

Patent Document

[Patent Document 1] Japanese Patent Application Publication No. 2016-115282
[Patent Document 2] Japanese Patent Application Publication No. 2017-139019

DISCLOSURE OF THE INVENTION

Technical Problem

In a technique for recognizing and registering a product being an accounting target, based on an image capturing the product being the accounting target, accurately recognizing a product is desired. However, products being highly similar in appearance to each other are present, such as products of the same kind with different volumes or products of the same series. In order to accurately discriminate such products from each other, special processing (hereinafter, referred to as "first processing") is required. The first processing is exemplified by, for example, "a request for work (rotation induction of an object, or the like) to an operator" or the like disclosed in Patent Document 1, but is not limited thereto.

Accordingly, the present inventors have considered a configuration that previously registers a product requiring the first processing, and performs the first processing when a product recognized based on an image capturing a product being an accounting target is registered as a product requiring the first processing. This configuration requires a technique for efficiently managing (registering, deleting, and the like) information indicating whether each product is a product requiring the first processing.

A problem of the present invention is to achieve a technique for efficiently managing (registering, deleting, and the like) information indicating whether each product is a product requiring first processing.

Solution to Problem

The present invention provides
a processing apparatus including:
a product database management means for registering a registration target product in a product database; and
a special information management means for, when a similar-appearance product being similar in appearance to the registration target product is registered in the product database, registering both the registration target product and the similar-appearance product as first processing target products requiring first processing, and also registering information associating the registration target product and the similar-appearance product.

Moreover, the present invention provides
an accounting apparatus including:
a first recognition means for recognizing a product included in a processing image, by feature value matching based on a previously stored feature value of appearance of each of a plurality of products;
a second assessment means for assessing whether a product recognized by the first recognition means is registered as a first processing target product requiring first processing;
a second recognition means for recognizing a product included in the processing image, based on an estimation model of recognizing a product from a product image generated by machine learning based on a product image of the first processing target product, and the processing image, when a product recognized by the first recognition means is registered as the first processing target product;
a determination means for determining a product included in the processing image, based on a recognition result of the first recognition means, and a recognition result of the second recognition means, when a product recognized by the first recognition means is registered as the first processing target product; and
a registration means for registering, as an accounting target, a product determined by the determination means, when a product recognized by the first recognition means is registered as the first processing target product, and registering, as an accounting target, a product recognized by the first recognition means, when a product recognized by the first recognition means is not registered as the first processing target product.

Moreover, the present invention provides
an accounting apparatus including:
a recognition means for recognizing a product included in a processing image;
a second assessment means for assessing whether a product recognized by the recognition means is registered as a first processing target product requiring first processing;
an execution means for, when a recognized product is registered as the first processing target product, executing at least either one of processing of outputting, to a worker, information requesting to confirm whether a recognition result is correct or wrong, and accepting a reply, and processing of outputting, to a worker, a candidate list including a similar product to a recognized product, and accepting a selection from the candidate list; and
a registration means for registering a product being an accounting target, based on a recognition result by the recognition means, and a result of processing by the execution means.

Moreover, the present invention provides a processing method including:

by a computer, registering a registration target product in a product database; and, when a similar-appearance product being similar in appearance to the registration target product at a predetermined level or more is registered in the product database, registering both the registration target product and the similar-appearance product as first processing target products requiring first processing, and also registering information associating the registration target product and the similar-appearance product.

Moreover, the present invention provides a program causing a computer to function as a product database management means for registering a registration target product in a product database, and a special information management means for, when a similar-appearance product being similar in appearance to the registration target product at a predetermined level or more is registered in the product database, registering both the registration target product and the similar-appearance product as first processing target products requiring first processing, and also registering information associating the registration target product and the similar-appearance product.

Advantageous Effects of Invention

The present invention achieves a technique for efficiently managing (registering, deleting, and the like) information indicating whether each product is a product requiring first processing.

BRIEF DESCRIPTION OF THE DRAWINGS

The above-described object, other objects, features, and advantages effects will become more apparent from a preferred example embodiment described below and the following accompanying drawings.

FIG. 3 is a diagram schematically illustrating one example of information processed by the processing apparatus according to the present example embodiment.

FIG. 4 is a diagram schematically illustrating one example of information processed by the processing apparatus according to the present example embodiment.

FIG. 5 is a diagram schematically illustrating one example of information processed by the processing apparatus according to the present example embodiment.

FIG. 14 is a flowchart illustrating one example of a flow of processing of the accounting apparatus according to the present example embodiment.

DESCRIPTION OF EMBODIMENTS

First Example Embodiment

First, an outline of a processing apparatus according to the present example embodiment is described. The processing apparatus has a function of efficiently managing (registering, deleting, and the like) information indicating whether each product is a product requiring first processing. Specifically, when a certain product is registered in a product database, the processing apparatus assesses whether another product being similar in appearance to the product at a predetermined level or more is registered in the product database. Then, when the another product is registered, the processing apparatus registers both the product and the another similar product as products requiring the first processing, and associates the product and the another similar product. Moreover, when a certain product is deleted from a product database, the processing apparatus determines another product being associated with the product, i.e., another product being similar in appearance to the product at a predetermined level or more, and deletes the another similar product from products requiring the first processing. Thus, the processing apparatus can automatically update information indicating whether each product is a product requiring the first processing, when a certain product is registered in a product database, or when a certain product is deleted from a product database.

Figure 1:
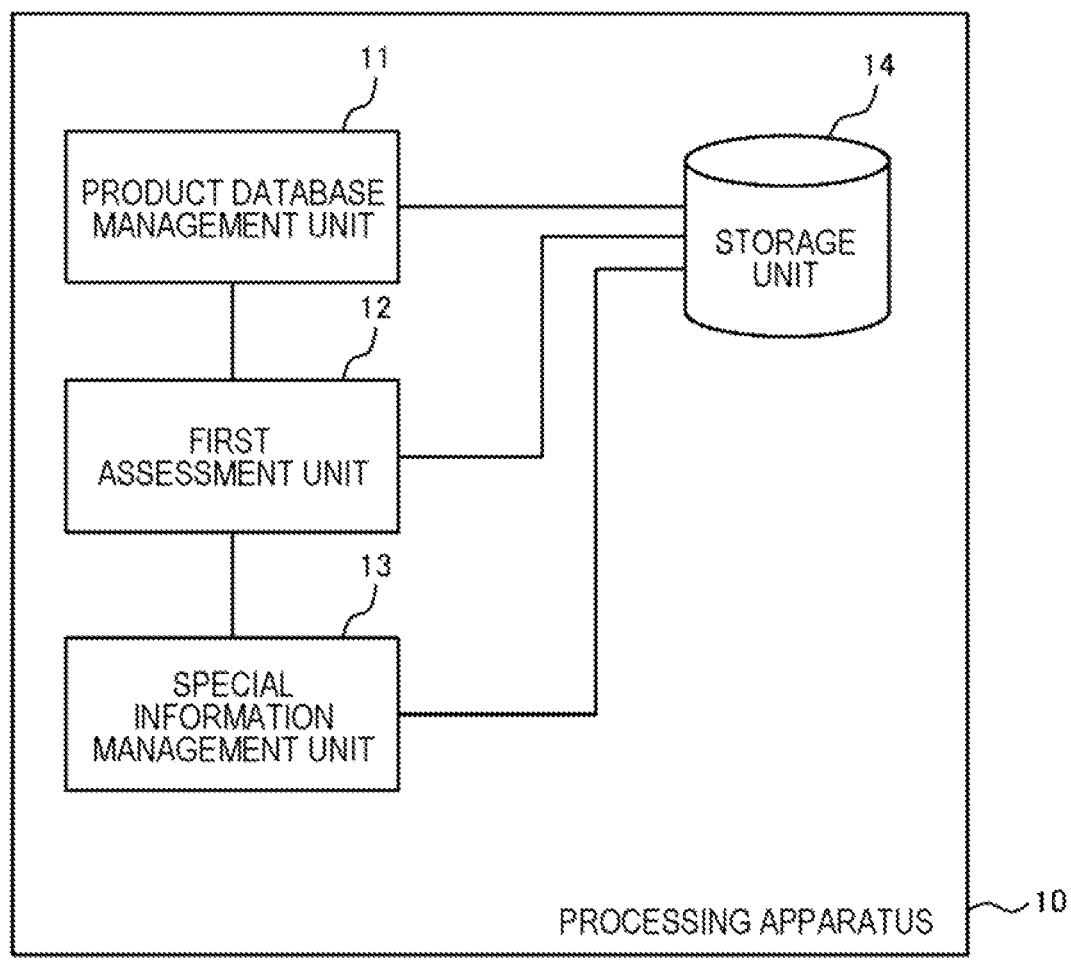
FIG. 1 is one example of a functional block diagram of a processing apparatus according to the present example embodiment.

Hereinafter, a configuration of the processing apparatus is described in detail. FIG. 1 illustrates one example of a functional block diagram of a processing apparatus 10. As illustrated, the processing apparatus 10 includes a product database management unit 11, a first assessment unit 12, a special information management unit 13, and a storage unit 14. Note that, the processing apparatus 10 may not include the storage unit 14. In this case, an external apparatus configured communicably with the processing apparatus 10 includes the storage unit 14.

Each functional unit of the processing apparatus 10 is achieved by any combination of hardware and software mainly including a central processing unit (CPU) of any computer, a memory, a program loaded onto the memory, a storage unit such as a hard disk that stores the program (that can store not only a program previously stored from a phase of shipping an apparatus but also a program downloaded from a storage medium such as a compact disc (CD) or a server or the like on the Internet), and an interface for network connection. Then, it is appreciated by a person skilled in the art that there are a variety of modified examples of a method and an apparatus for the achievement.

Figure 2:
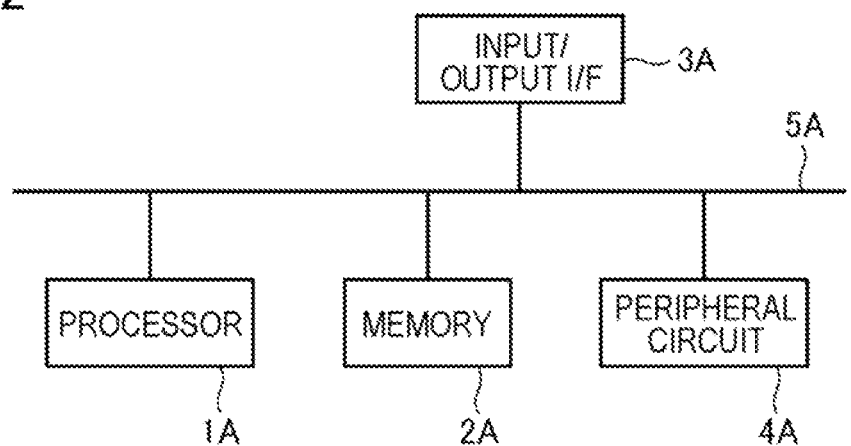
FIG. 2 is a diagram illustrating one example of a hardware configuration of an apparatus according to the present example embodiment.

FIG. 2 is a block diagram illustrating a hardware configuration of the processing apparatus 10. As illustrated in FIG. 2, the processing apparatus 10 includes a processor 1A, a memory 2A, an input/output interface 3A, a peripheral circuit 4A, and a bus 5A. The peripheral circuit 4A includes various modules. The processing apparatus 10 may not include the peripheral circuit 4A. Note that, the processing apparatus 10 may be configured by a plurality of physically and/or logically separated apparatuses, or may be configured by one physically and/or logically integrated apparatus. When the processing apparatus 10 is configured by a plurality of physically and/or logically separated apparatuses, each of the plurality of apparatuses can include the hardware configuration described above.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each of modules, and perform an arithmetic operation, based on an arithmetic result of each of the modules.

Returning to FIG. 1, a configuration of each functional unit is described in detail. Herein, a configuration of each functional unit is described separately in "a scene where a certain product is registered in a product database", and "a scene where a certain product is deleted from a product database".

A Scene where a Certain Product is Registered in a Product Database

The scene is supposed to be a scene where a product database is newly generated, a scene where a product database is updated in response to addition of a handled product, or the like.

The product database management unit 11 registers a registration target product in a product database, based on a user input. The registration target product is a product to be newly registered in the product database. For example, a product handled in each store is registered in the product database of each store. The product database is used in a point of sales (POS) system used in a retail store or the like.

FIGS. 3 and 4 each schematically illustrate one example of the product database. In the product database in FIG. 3, product discrimination information that discriminates a plurality of products from one another, a product name, and a unit price are registered in association with one another. In the product database in FIG. 4, product discrimination information, discrimination information (an image file name or the like) of a product image of each product, and a feature value extracted from an image of each product are registered in association with one another. The storage unit 14 stores these pieces of information. Note that, a kind of illustrated information is only one example, and the product database may include other information. The product database management unit 11 registers the pieces of information relating to the registration target product in the product database.

Returning to FIG. 1, the first assessment unit 12 assesses whether a similar-appearance product being similar in appearance to the registration target product at a predetermined level or more is registered in the product database. The first assessment unit 12 can assess, based on a product image, whether a similar-appearance product is registered in the product database. For example, the first assessment unit 12 computes a similarity degree of appearance between the registration target product and each product registered in the product database, by predetermined similarity degree computation processing (example: feature value matching) based on a feature value extracted from a product image of the registration target product, and a feature value of each product registered in the product database. Then, the first assessment unit 12 determines, as a similar-appearance product, a product for which the similarity degree is equal to or more than a threshold value.

When it is assessed that a similar-appearance product is registered, the special information management unit 13 registers both the registration target product and the similar-appearance product as first processing target products requiring the first processing, and also registers information associating the registration target product and the similar-appearance product. The "first processing" is processing performed in order to accurately recognize a product, in a technique for recognizing and registering a product being an accounting target, based on an image capturing the product being the accounting target. For example, a product being highly similar in appearance to another product, such as a product of the same kind with a different volume or a product of the same series, is registered as a first processing target product. Note that, in the present example embodiment, details of the first processing are not particularly limited. A specific example of the first processing is described in the following example embodiment.

FIG. 5 schematically illustrates one example of information managed by the special information management unit 13. In the illustrated example, product discrimination information registered in the product database, a first processing target product flag indicating whether each product is registered as a first processing target product, and product discrimination information of a similar-appearance product being associated with each product are registered in association with one another. As illustrated, a plurality of pieces of product discrimination information of a similar-appearance product can be registered in association with one piece of product discrimination information. The storage unit 14 stores these pieces of information. Note that, a kind of illustrated information is only one example, and information managed by the special information management unit 13 may include other information.

Figure 6:
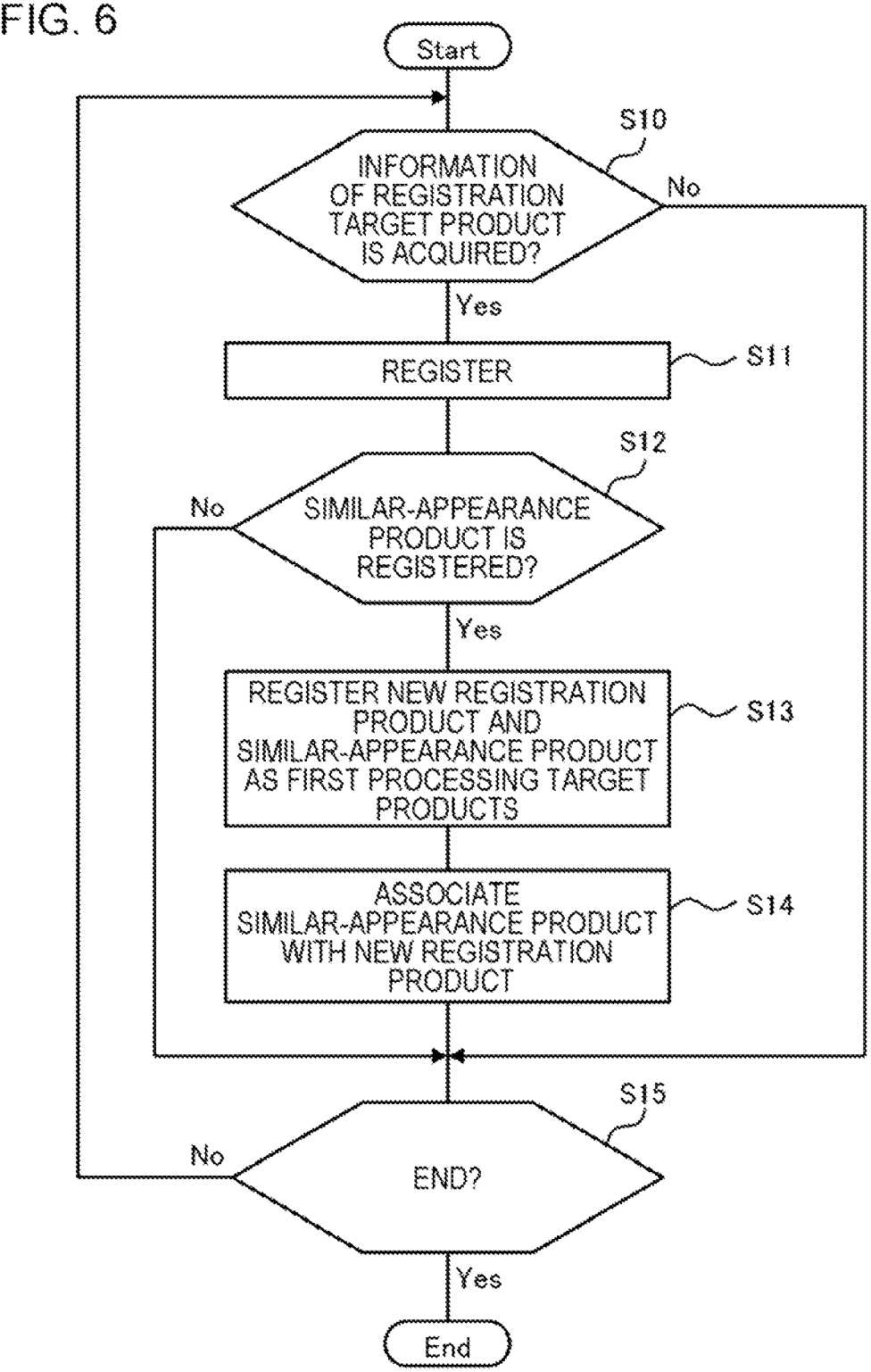
FIG. 6 is a flowchart illustrating one example of a flow of processing of the processing apparatus according to the present example embodiment.

Herein, one example of a flow of processing of the processing apparatus 10 in a scene where a certain product is registered in a product database is described by use of a flowchart in FIG. 6.

First, when acquiring various pieces of information of a registration target product to be newly registered in a product database (Yes in S10), the product database management unit 11 registers the various pieces of information of the registration target product in the product database (S11). Various pieces of information are pieces of information to be registered in the product database, and are exemplified by, for example, product discrimination information, a product name, a unit price, an image, image discrimination information, a feature value, and the like, but are not limited thereto. For example, the product database management unit 11 may acquire the pieces of information input by a user via an input apparatus. Otherwise, the product database management unit 11 may acquire information from a file or a folder including pieces of information of a plurality of products sequentially one by one.

Thereafter, the first assessment unit 12 assesses whether a similar-appearance product being similar in appearance to the registration target product at a predetermined level or more is registered in the product database (S12). For example, the first assessment unit 12 computes a similarity degree of appearance between the registration target product and each product registered in the product database, by predetermined similarity degree computation processing (example: feature value matching) based on a feature value extracted from a product image of the registration target product, and a feature value of each product registered in the product database. Then, the first assessment unit 12 determines, as a similar-appearance product, a product for which the similarity degree is equal to or more than a threshold value.

When it is assessed that the similar-appearance product is registered in the product database (Yes in S12), the special information management unit 13 registers both the registration target product and the similar-appearance product as first processing target products requiring the first processing (S13), and also registers information associating the registration target product and the similar-appearance product (S14). For example, the special information management unit 13 puts up, in the information illustrated in FIG. 5, a first processing target product flag of product discrimination information of the registration target product and each piece of product discrimination information of the similar-appearance product. Then, the special information management unit 13 registers the product discrimination information of the registration target product and the product discrimination information of the similar-appearance product in association with each other.

On the other hand, when it is assessed that the similar-appearance product is not registered in the product database (No in S12), pieces of processing in S13 and S14 are not executed.

Note that, the flow of the processing is only one example, and is not limited thereto. For example, S11 may be located between S14 and S15, and executed after a result becomes No in S12 or after S14. Moreover, a processing order of S13 and S14 may be reverse.

A Scene where a Certain Product is Deleted from a Product Database

The scene is supposed to be a scene where a product database is updated in response to deletion of a handled product, or the like.

Returning to FIG. 1, the product database management unit 11 deletes a deletion target product from a product database, based on a user input. The deletion target product is a product to be deleted from the product database. For example, a discontinued product, a product of which handling in a store is stopped, or the like becomes a deletion target product.

The special information management unit 13 deletes, from first processing target products, a product being associated with the deletion target product. More specifically, the special information management unit 13 deletes, from first processing target products, a product that is associated with the deletion target product and that is not associated with another product.

For example, it is assumed that a product discriminated by product discrimination information "0022238" has become a deletion target product, in a state where the information illustrated in FIG. 5 is registered. In this case, the special information management unit 13 eliminates a first processing target flag of product discrimination information "0013821" that is associated with the product discrimination information "0022238" and that is not associated with another piece of product discrimination information (deletes from first processing target products).

Moreover, it is assumed that a product discriminated by product discrimination information "0101337" has become a deletion target product, in a state where the information illustrated in FIG. 5 is registered. In this case, product discrimination information "0319191" is associated with the product discrimination information "0101337", but also associated with another piece of product discrimination information "2828111". Thus, the special information management unit 13 keeps up a first processing target product flag of the product discrimination information "0319191" (maintains registration as a first processing target product). Then, the special information management unit 13 deletes the product discrimination information "0101337" of a deletion target product from similar-appearance product discrimination information of the product discrimination information "0319191".

Figure 7:
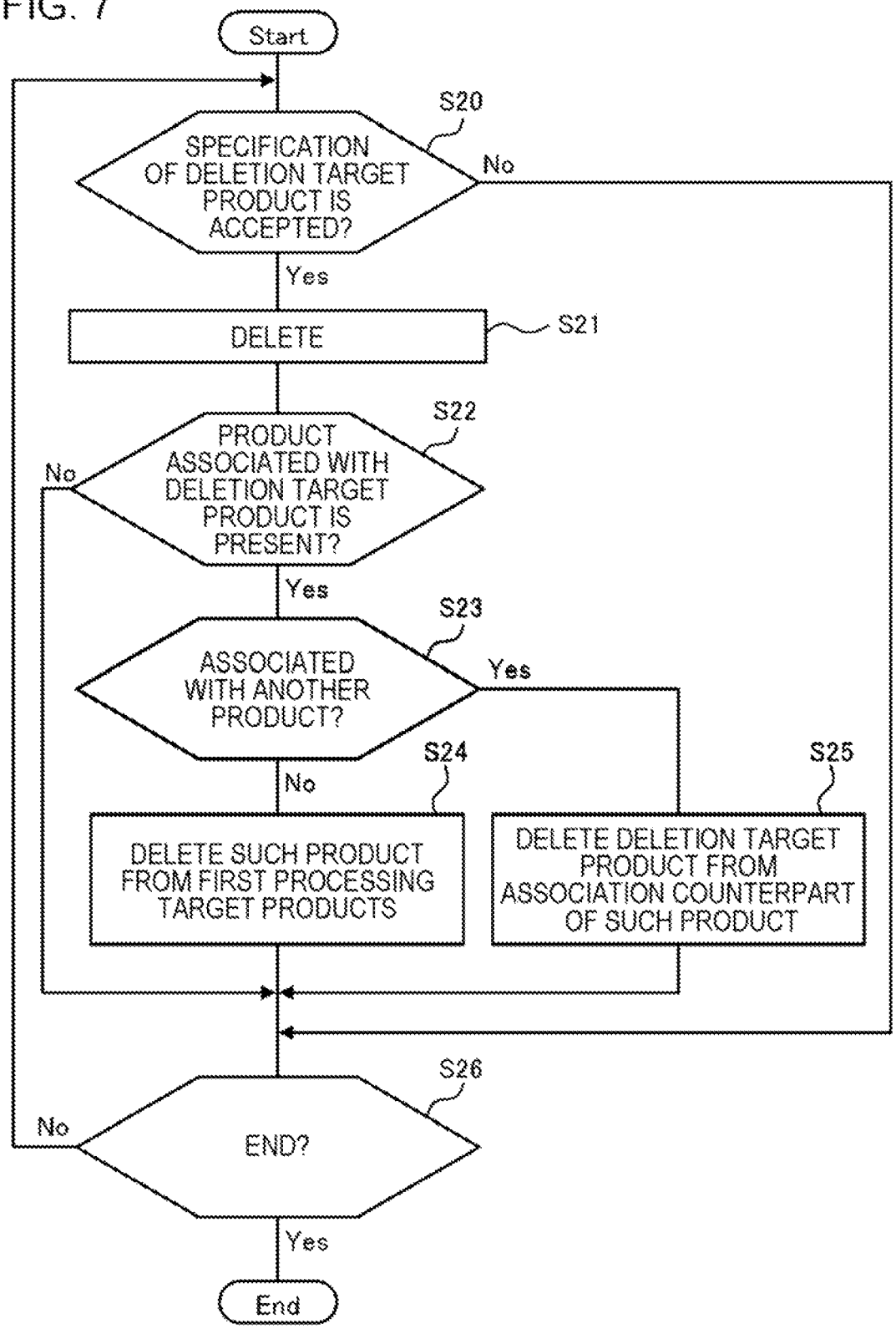
FIG. 7 is a flowchart illustrating one example of a flow of processing of the processing apparatus according to the present example embodiment.

Herein, one example of a flow of processing of the processing apparatus 10 in a scene where a certain product is deleted from a product database is described by use of a flowchart in FIG. 7.

First, when a user input specifying a deletion target product is accepted (Yes in S20), the product database management unit 11 deletes information of the product from a product database (S21).

Thereafter, the special information management unit 13 confirms whether a product (hereinafter, a "first product" in the description of this flow) registered in association with the deletion target product is present (S22). When the first product is present (Yes in S22), the special information management unit 13 confirms whether the first product is associated with another product other than the deletion target product (S23).

When the first product is not associated with the another product (No in S23), the special information management unit 13 deletes the first product from first processing target products (S24). For example, the special information management unit 13 eliminates a first processing target product flag being associated with product discrimination information of the first product, in the information illustrated in FIG. 5.

On the other hand, when the first product is associated with the another product (Yes in S23), the special information management unit 13 maintains registration determining the first product as a first processing target product. Then, the special information management unit 13 deletes the deletion target product from an association counterpart of the first product (S25). For example, in the information illustrated in FIG. 5, the special information management unit 13 keeps up a first processing target product flag being associated with product discrimination information of the first product, and deletes product discrimination information of the deletion target product from similar-appearance product discrimination information being associated with product discrimination information of the first product.

Note that, the flow of the processing is only one example, and is not limited thereto. For example, S21 may be located after S24 and S25 and before S26, and executed after a result becomes No in S22, after S24, or after S25.

The processing apparatus 10 according to the present example embodiment described above can automatically update information indicating whether each product is a first processing target product requiring the first processing, when a certain product is registered in a product database, or when a certain product is deleted from a product database. Such a processing apparatus 10 enables information indicating whether each product is a first processing target product requiring the first processing to be efficiently and easily managed (registered, deleted, and the like).

Moreover, the processing apparatus 10 according to the present example embodiment can assess whether each product requires the first processing, based on a similarity degree computed by a computer. This enables only a product truly requiring the first processing to be accurately registered as a first processing target product requiring the first processing.

Moreover, the processing apparatus 10 according to the present example embodiment can assess whether a product similar in appearance to a product to be deleted is registered in a product database, and update, in response to an assessment result, information indicating whether each product is a first processing target product requiring the first processing, not only when a product is registered in the product database, but also when a product is deleted from the product database. As a result, a disadvantage can be suppressed where a product for which the first processing has become unnecessary due to deletion of a certain product from a product database remains registered as a first processing target product requiring the first processing.

Moreover, the processing apparatus 10 according to the present example embodiment can register both products similar in appearance to each other as first processing target products requiring the first processing, and also register the two products in association with each other. Thus, when a certain product is deleted from a product database, whether a product similar in appearance to a product to be deleted is registered in a product database can be assessed based on a relation of the association. As a result, processing of unnecessarily computing a similarity degree between products can be avoided, and a processing burden of a computer can be lessened.

Second Example Embodiment

Figure 8:
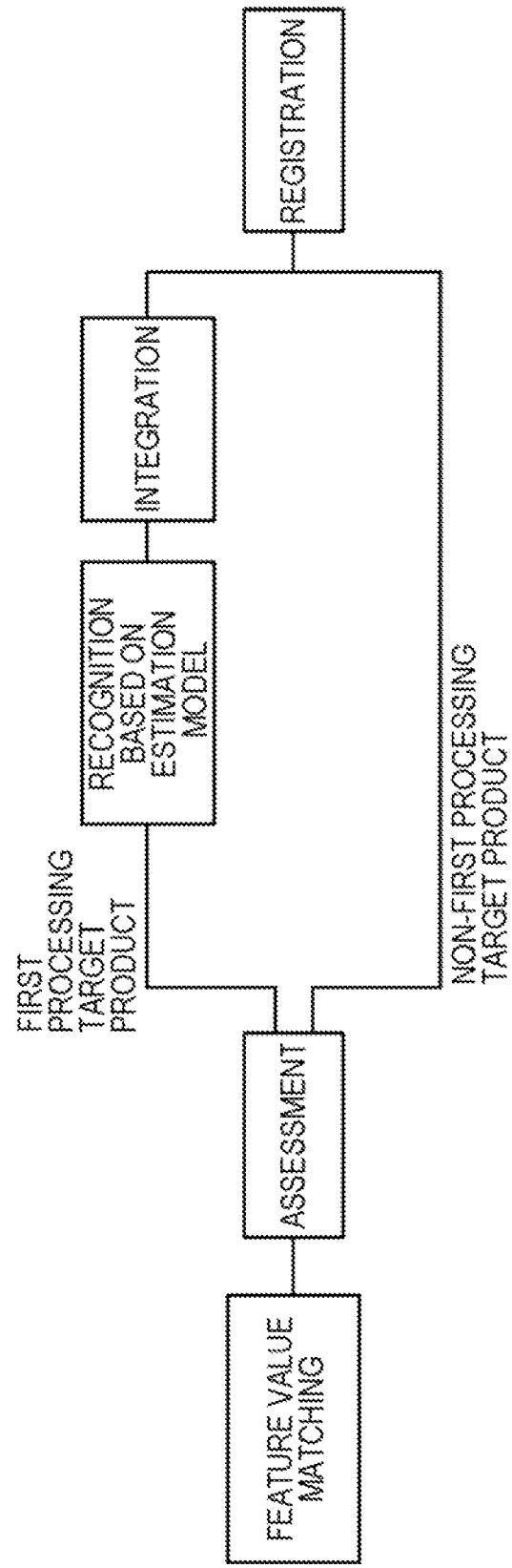
FIG. 8 is a diagram for describing an outline of processing of an accounting apparatus according to the present example embodiment.

First, an outline of an accounting apparatus according to the present example embodiment is described by use of FIG. 8. The accounting apparatus performs accounting processing, based on "information indicating whether each product is a first processing target product requiring first processing (see FIG. 5)" generated by a processing apparatus 10.

Specifically, first, as illustrated in FIG. 8, the accounting apparatus recognizes a product being an accounting target, by feature value matching based on an image capturing the product being the accounting target. Thereafter, the accounting apparatus refers to information indicating whether each product is a first processing target product requiring first processing, and assesses whether the recognized product is registered as a first processing target product.

Then, when the recognized product is registered as a first processing target product, the accounting apparatus recognizes the product being the accounting target, based on an "estimation model of recognizing a product from a product image" generated by machine learning based on a product image of the first processing target product. Then, the accounting apparatus integrates, based on a predetermined rule, a result of feature value matching and a result of recognition based on the estimation model, and recognizes the product being the accounting target, based on an integration result. Then, the accounting apparatus registers the recognized product as the product being the accounting target.

On the other hand, when the product recognized by the feature value matching is not registered as a first processing target product, the accounting apparatus recognizes, as a product being an accounting target, the product recognized by the feature value matching.

Next, an outline of the processing apparatus 10 according to the present example embodiment is described. The processing apparatus 10 further has a function of generating an estimation model of recognizing a product from a product image, by machine learning based on a product image of a first processing target product, in addition to the function described in the first example embodiment.

Hereinafter, configurations of the accounting apparatus and the processing apparatus 10 according to the present example embodiment are described in detail.

Processing Apparatus 10

Figure 9:
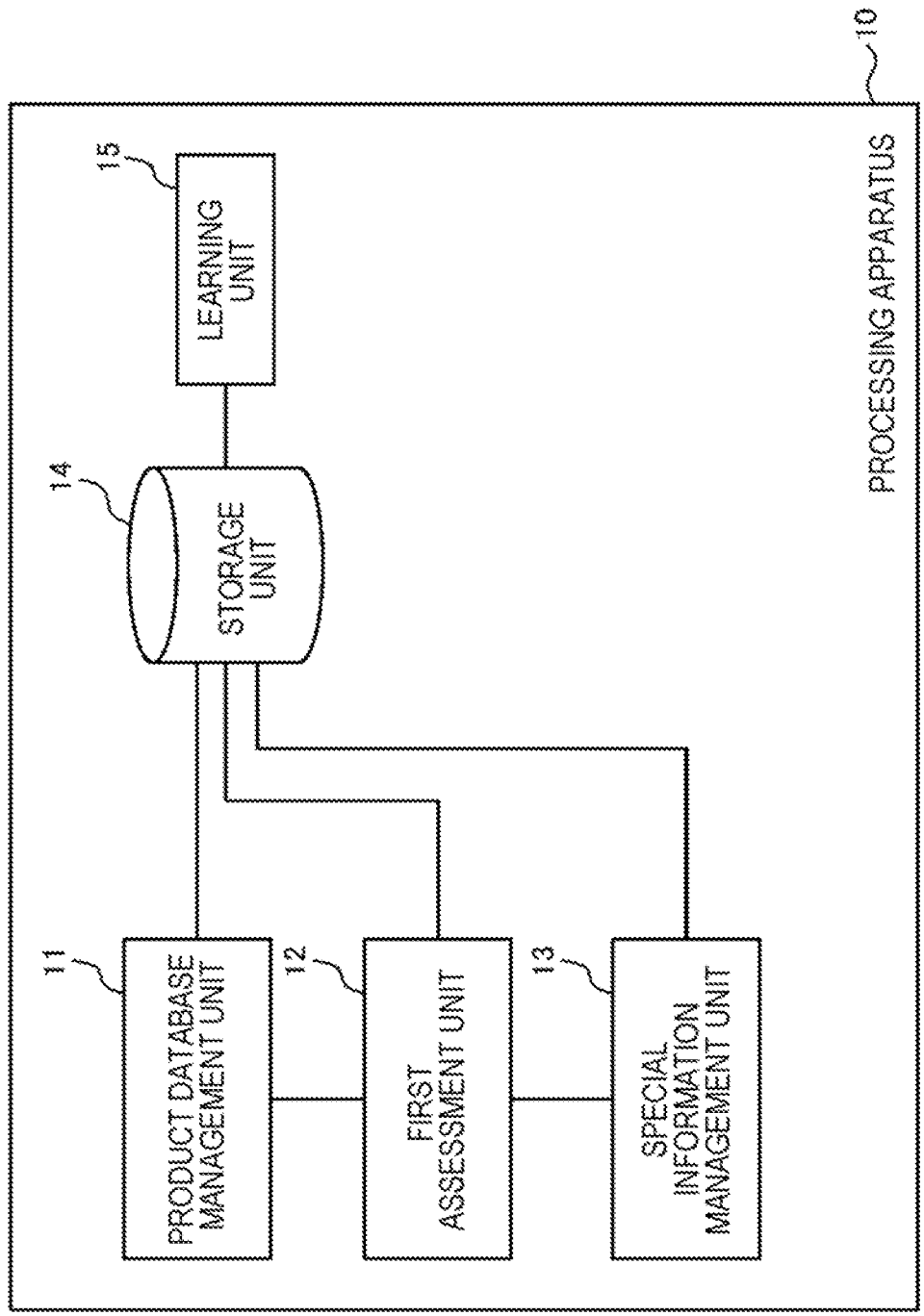
FIG. 9 is one example of a functional block diagram of the processing apparatus according to the present example embodiment.

FIG. 9 illustrates one example of a functional block diagram of the processing apparatus 10. As illustrated, the processing apparatus 10 includes a product database management unit 11, a first assessment unit 12, a special information management unit 13, a storage unit 14, and a learning unit 15. Note that, the processing apparatus 10 may not include the storage unit 14. In this case, an external apparatus configured communicably with the processing apparatus 10 includes the storage unit 14.

Since configurations of the product database management unit 11, the first assessment unit 12, the special information management unit 13, and the storage unit 14 are similar to those according to the first example embodiment, description herein is omitted. Moreover, since one example of a hardware configuration of the processing apparatus 10 is similar to that according to the first example embodiment, description herein is omitted.

The learning unit 15 generates an estimation model of recognizing a product from a product image, by machine learning based on a product image of a first processing target product. For example, the learning unit 15 generates the above-described estimation model, by machine learning based on training data associating a product image of a first processing target product with information (example: product discrimination information, a product name, and the like) discriminating the first processing target product. For example, processing of generating this estimation model becomes first processing.

Note that, "information indicating whether each product is a first processing target product requiring first processing" is regularly or irregularly updated. Accordingly, the learning unit 15 may repeatedly perform machine learning at a predetermined timing, and update an estimation model. For example, the learning unit 15 can perform machine learning based on a product image of a first processing target product, and generate a new estimation model, after at least either one of a timing at which one or a plurality of new products are registered as a first processing target product, and a timing at which one or a plurality of products are deleted from first processing target products.

Accounting Apparatus

The accounting apparatus is placed in a store, and executes registration processing of registering product information of a product being an accounting target, and computing an accounting amount. Note that, the accounting apparatus may further execute settlement processing of settling an accounting amount. When the accounting apparatus does not execute the settlement processing, a settlement apparatus physically and/or logically separated from the accounting apparatus executes the settlement processing. In this case, the accounting apparatus transmits a computed accounting amount to the settlement apparatus after executing registration processing. The accounting apparatus may be an apparatus presupposed to be operated by a clerk, or may be an apparatus presupposed to be operated by a customer.

Figure 10:
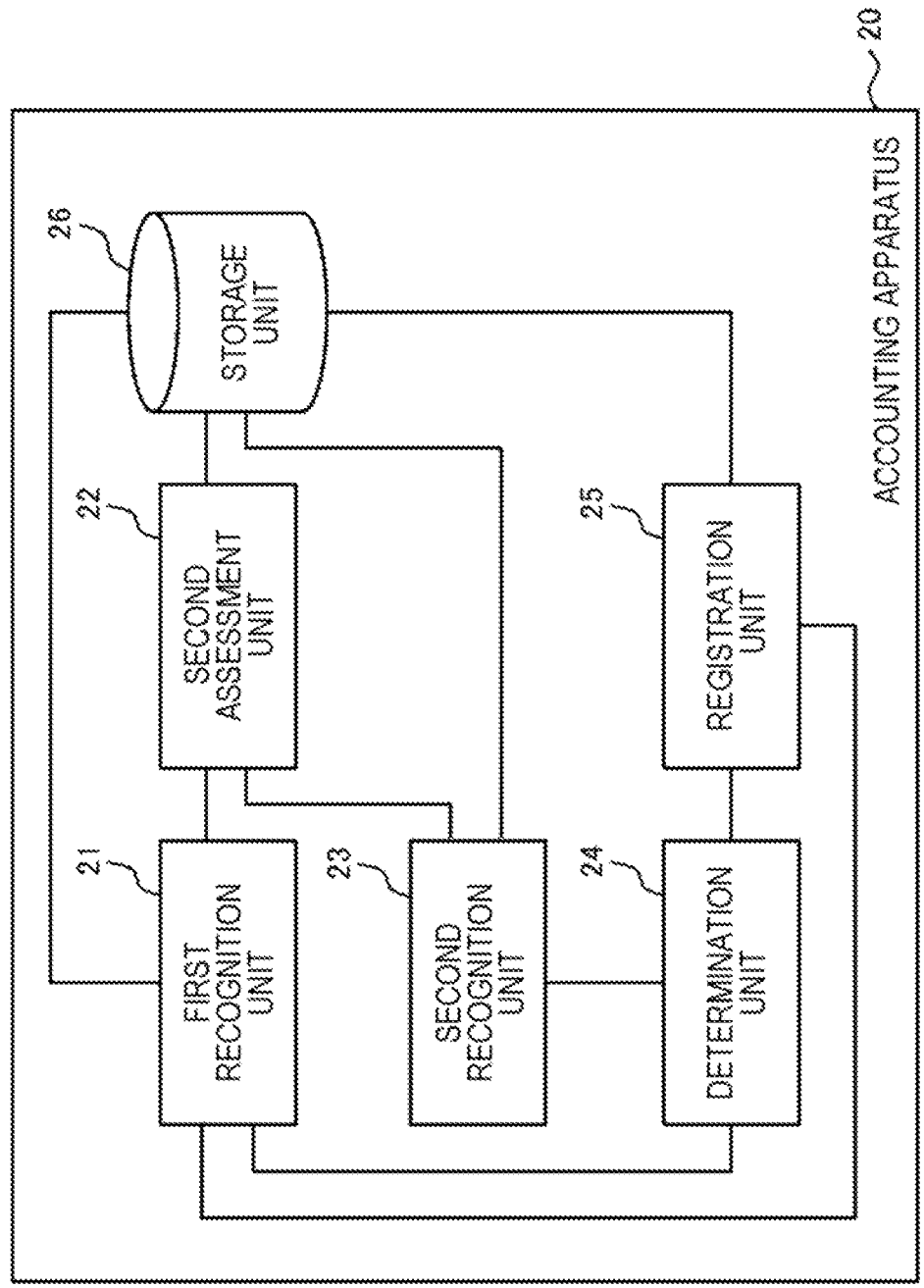
FIG. 10 is one example of a functional block diagram of the accounting apparatus according to the present example embodiment.

FIG. 10 illustrates one example of a functional block diagram of an accounting apparatus 20. As illustrated, the accounting apparatus 20 includes a first recognition unit 21, a second assessment unit 22, a second recognition unit 23, a determination unit 24, a registration unit 25, and a storage unit 26. Note that, the accounting apparatus 20 may not include the storage unit 26. In this case, an external apparatus configured communicably with the accounting apparatus 20 includes the storage unit 26.

Each functional unit of the accounting apparatus 20 is achieved by any combination of hardware and software mainly including a CPU of any computer, a memory, a program loaded onto the memory, a storage unit such as a hard disk that stores the program (that can store not only a program previously stored from a phase of shipping an apparatus but also a program downloaded from a storage medium such as a CD or a server or the like on the Internet), and an interface for network connection. Then, it is appreciated by a person skilled in the art that there are a variety of modified examples of a method and an apparatus for the achievement.

One example of a hardware configuration of the accounting apparatus 20 is illustrated in FIG. 2. Since description of FIG. 2 is as described above, description herein is omitted.

Returning to FIG. 10, the first recognition unit 21 recognizes a product included in a processing image, by feature value matching based on a previously stored feature value of appearance of each of a plurality of products. For example, the first recognition unit 21 may compute, by feature value matching, a similarity degree between a product included in a processing image, and each of a plurality of products. Then, the first recognition unit 21 may recognize, as a product included in a processing image, a product for which the similarity degree is highest. Otherwise, the first recognition unit 21 may recognize, as a product included in a processing image, a product for which the similarity degree is highest, and for which the similarity degree is equal to or more than a threshold value. Note that, the threshold value may vary from product to product. For example, the threshold value may vary between a first processing target product and another product.

The second assessment unit 22 assesses whether the product recognized by the first recognition unit 21 is registered as a first processing target product requiring first processing.

For example, the storage unit 26 may store "information indicating whether each product is a first processing target product requiring first processing" generated by the processing apparatus 10. Then, the second assessment unit 22 may refer to the information, and assess whether the product recognized by the first recognition unit 21 is registered as a first processing target product.

Otherwise, the second assessment unit 22 may transmit, to an external server such as a store server, discrimination information of the product recognized by the first recognition unit 21, and inquire whether the product is registered as a first processing target product. In a case of this example, the external server refers to "information indicating whether each product is a first processing target product requiring first processing", and assesses whether the product recognized by the first recognition unit 21 is registered as a first processing target product. Then, the external server transmits an assessment result to the second assessment unit 22.

When the product recognized by the first recognition unit 21 is registered as a first processing target product, the second recognition unit 23 recognizes a product included in a processing image, based on an "estimation model of recognizing a product from a product image" generated by machine learning based on a product image of the first processing target product, and the processing image.

For example, the storage unit 26 stores the estimation model generated by the processing apparatus 10. Then, the second recognition unit 23 recognizes a product included in the processing image, based on the estimation model stored in the storage unit 26.

When the product recognized by the first recognition unit 21 is registered as a first processing target product, the determination unit 24 determines a product included in the processing image, based on a recognition result of the first recognition unit 21, and a recognition result of the second recognition unit 23.

One example of a determination scheme is described below, but is not limited thereto. For example, in a recognition result of the first recognition unit 21, a plurality of products are ranked in descending order of similarity degrees. Similarly, in a recognition result of the second recognition unit 23, a plurality of products are ranked in descending order of similarity degrees. Then, points are set for each rank in the recognition result of the first recognition unit 21, and each rank in the recognition result of the second recognition unit 23. An example of point setting is indicated by "similarity degree No. 1 in the recognition result of the first recognition unit 21: five points, similarity degree No. 2: three points, similarity degree No. 3: one point, similarity degree No. 1 in the recognition result of the second recognition unit 23: ten points, similarity degree No. 2: five points, similarity degree No. 3: three points", but the example is only one example, and is not limited thereto. Then, the determination unit 24 recognizes, as a product included in the processing image, a product of which gain points are highest. Note that, a point may be computed in consideration of not only a rank but also a computed similarity degree.

When the product recognized by the first recognition unit 21 is registered as a first processing target product, the registration unit 25 recognizes, as an accounting target, the product determined by the determination unit 24. On the other hand, when the product recognized by the first recognition unit 21 is not registered as a first processing target product, the registration unit 25 recognizes, as an accounting target, the product determined by the first recognition unit 21.

For example, the registration unit 25 acquires, from a product master, product information (example, a product name, a unit price, and the like) of a product to be registered as an accounting target, and registers the acquired product information. The product master may be stored by a store server, or may be stored by the accounting apparatus 20. Moreover, the registration unit 25 may compute an accounting amount, based on product information of the product registered as the accounting target.

The accounting apparatus 20 may include a function of executing the settlement processing of settling an accounting amount. In the settlement processing, for example, the accounting apparatus 20 accepts insertion of cash, accepts an input of credit card information, communicates with a server of a credit card company and performs settlement processing, accepts an input of a received amount, computes a change, sends out a computed change, executes other processing such as code settlement, and issues a receipt.

Note that, when the accounting apparatus 20 does not include a function of executing the settlement processing, the settlement apparatus physically and/or logically separated from the accounting apparatus 20 executes the settlement processing. In this case, the accounting apparatus 20 transmits a computed accounting amount to the settlement apparatus.

Figure 11:
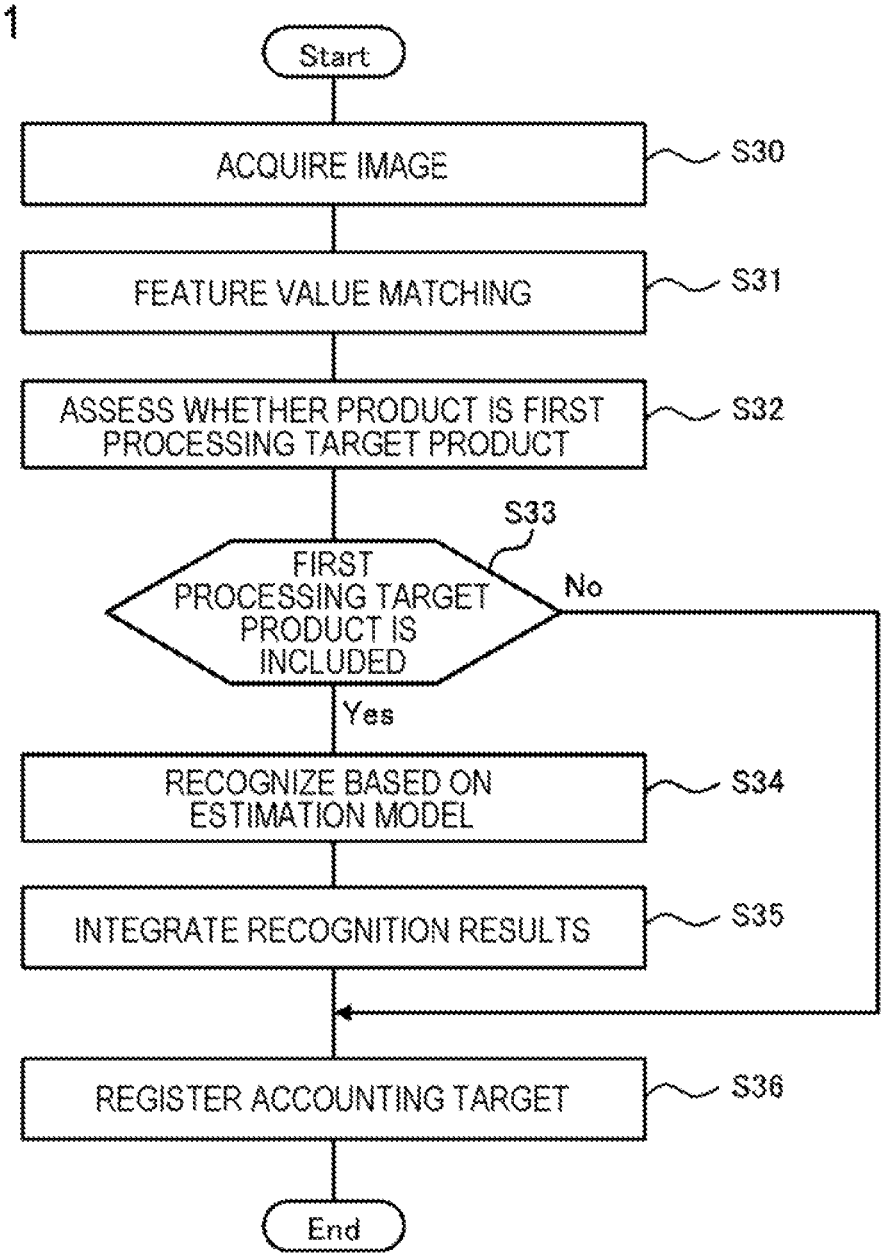
FIG. 11 is a flowchart illustrating one example of a flow of processing of the accounting apparatus according to the present example embodiment.

Next, one example of a flow of registration processing by the accounting apparatus 20 is described by use of a flowchart in FIG. 11.

First, the accounting apparatus 20 acquires a processing image (S30). For example, one or a plurality of cameras are placed in a position and a direction where one or a plurality of products being accounting targets mounted on a counter are captured. For example, one or a plurality of cameras capturing a product mounted on the counter from above (immediately above, obliquely above, or the like), one or a plurality of cameras capturing a product mounted on the counter from a side, or one or a plurality of cameras capturing a product mounted on the counter from below (immediately below, obliquely below, or the like) across the counter may be placed. Then, the accounting apparatus 20 may acquire an image generated by such a camera. Note that, when one or a plurality of cameras capturing a product mounted on the counter from below (immediately below, obliquely below, or the like) across the counter are placed, the counter is made of a transparent material (glass, plastic, or the like).

As another example, one camera may be placed for one accounting apparatus 20. Then, a worker may locate products being accounting targets in front of the camera one by one, and capture the products individually. Then, the accounting apparatus 20 may acquire an image generated by such a camera.

Next, the first recognition unit 21 recognizes one or a plurality of products included in the processing image, by feature value matching based on a previously stored feature value of appearance of each of a plurality of products (S31). For example, the first recognition unit 21 computes, by feature value matching, a similarity degree between a product included in the processing image and each of a plurality of products. Then, the first recognition unit 21 recognizes, as a product included in the processing image, a product for which the similarity degree is highest.

Next, the second assessment unit 22 assesses whether the product recognized by the first recognition unit 21 is registered as a first processing target product requiring first processing (S32). This assessment is performed based on "information indicating whether each product is a first processing target product requiring first processing" generated by the processing apparatus 10.

When a first processing target product is not included in the product recognized by the first recognition unit 21 (No in S33), the registration unit 25 acquires, from a product master, product information of the product recognized in S31, and registers the acquired product information as product information of an accounting target (S36).

On the other hand, when a first processing target product is included in the product recognized by the first recognition unit 21 (Yes in S33), the second recognition unit 23 recognizes a product included in the processing image, based on the processing image acquired in S30, and an estimation model of recognizing a product from a product image (S34). The estimation model is generated by machine learning based on an image of the first processing target product. Note that, when a plurality of products are included in the processing image, the second recognition unit 23 may cut out only a region where the first processing target product is present, and perform recognition processing, based on the cut-out image and the estimation model.

Thereafter, the determination unit 24 integrates a recognition result by the feature value matching in S31 with a recognition result based on the estimation model in S34, and determines a product included in the processing image (S35). Note that, when a plurality of products are included in the processing image, the determination unit 24 performs the integration processing only on a product assessed as a first processing target product.

After S35, the registration unit 25 registers a product being an accounting target, based on the recognition result by the feature value matching in S31, and the recognition result based on the estimation model in S34 (S36).

When a plurality of products are included in the processing image, the registration unit 25 acquires, from a product master, product information (example, a product name, a unit price, and the like) of the product determined in S35, and registers the acquired product information, in a product assessed as a first processing target product. On the other hand, in a product that has not been assessed to be a first processing target product, the registration unit 25 acquires, from a product master, product information of the product recognized in S31, and registers the acquired product information.

Moreover, when one product is included in the product image, the registration unit 25 acquires, from a product master, product information (example, a product name, a unit price, and the like) of the product determined in S35, and registers the acquired product information.

The processing apparatus 10 and the accounting apparatus 20 according to the present example embodiment described above achieve an advantageous effect similar to that according to the first example embodiment.

Moreover, the processing apparatus 10 and the accounting apparatus 20 according to the present example embodiment can recognize a first processing target product by performing two pieces of recognition processing and integrating results of the two pieces of recognition processing. As a result, recognition accuracy of a first processing target product can be heightened.

Moreover, the processing apparatus 10 and the accounting apparatus 20 according to the present example embodiment can recognize a first processing target product by performing two pieces of recognition processing and integrating results of the two pieces of recognition processing, and recognize another product by one piece of recognition processing. In this way, processing, with a great burden, of recognizing by performing two pieces of recognition processing and integrating results of the two pieces of recognition processing can be performed on only a product truly requiring the processing. Thus, recognition accuracy can be heightened without excessively increasing a processing burden of a computer.

Third Example Embodiment

Figure 12:
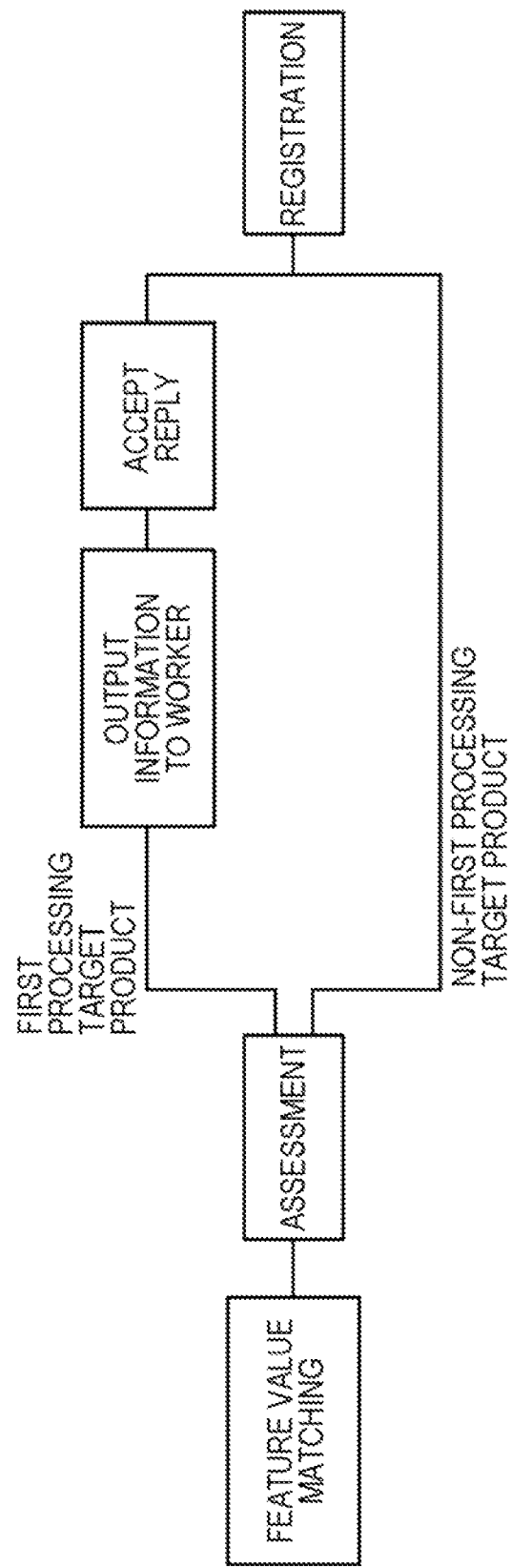
FIG. 12 is a diagram for describing an outline of processing of the accounting apparatus according to the present example embodiment.

First, an outline of an accounting apparatus according to the present example embodiment is described by use of FIG. 12. The accounting apparatus performs accounting processing, based on "information indicating whether each product is a first processing target product requiring first processing (see FIG. 5)" generated by a processing apparatus 10.

Specifically, first, as illustrated in FIG. 12, the accounting apparatus recognizes a product being an accounting target, by feature value matching based on an image capturing the product being the accounting target. Thereafter, the accounting apparatus refers to information indicating whether each product is a first processing target product requiring first processing, and assesses whether the recognized product is registered as a first processing target product.

Then, when the recognized product is registered as a first processing target product, the accounting apparatus outputs, to a worker, at least either one of information requesting to confirm whether a recognition result is correct or wrong, and a candidate list including a similar product to the recognized product. After outputting the pieces of information, the accounting apparatus accepts an input of a reply from the worker. Then, the accounting apparatus registers, as a product being an accounting target, a product determined based on the reply from the worker.

On the other hand, when the product recognized by feature value matching is not registered as a first processing target product, the accounting apparatus registers, as a product being an accounting target, a product recognized by feature value matching.

Accounting Apparatus

The accounting apparatus is placed in a store, and executes registration processing of registering product information of a product being an accounting target, and computing an accounting amount. Note that, the accounting apparatus may further execute settlement processing of settling an accounting amount. When the accounting apparatus does not execute the settlement processing, a settlement apparatus physically and/or logically separated from the accounting apparatus executes the settlement processing. In this case, the accounting apparatus transmits a computed accounting amount to the settlement apparatus after executing registration processing. The accounting apparatus may be an apparatus presupposed to be operated by a clerk, or may be an apparatus presupposed to be operated by a customer.

Figure 13:
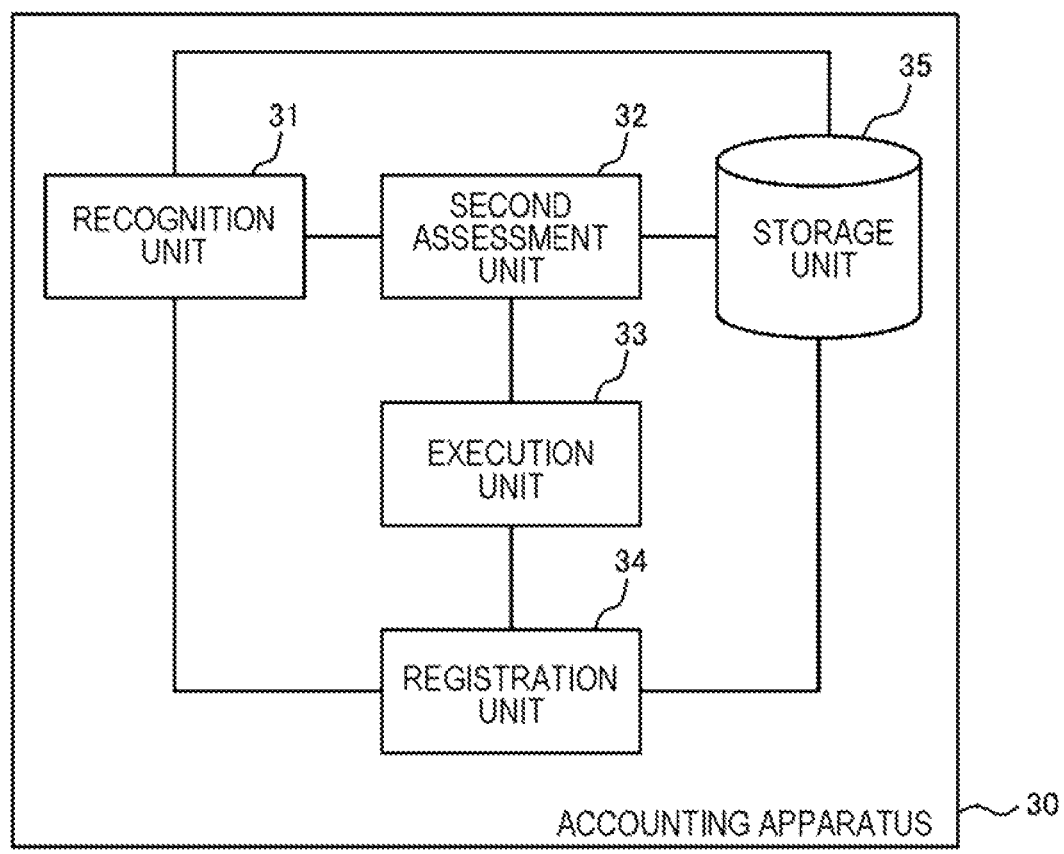
FIG. 13 is one example of a functional block diagram of the accounting apparatus according to the present example embodiment.

FIG. 13 illustrates one example of a functional block diagram of an accounting apparatus 30. As illustrated, the accounting apparatus 30 includes a recognition unit 31, a second assessment unit 32, an execution unit 33, a registration unit 34, and a storage unit 35. Note that, the accounting apparatus 30 may not include the storage unit 35. In this case, an external apparatus configured communicably with the accounting apparatus 30 includes the storage unit 35.

Each functional unit of the accounting apparatus 30 is achieved by any combination of hardware and software mainly including a CPU of any computer, a memory, a program loaded onto the memory, a storage unit such as a hard disk that stores the program (that can store not only a program previously stored from a phase of shipping an apparatus but also a program downloaded from a storage medium such as a CD or a server or the like on the Internet), and an interface for network connection. Then, it is appreciated by a person skilled in the art that there are a variety of modified examples of a method and an apparatus for the achievement.

One example of a hardware configuration of the accounting apparatus 30 is illustrated in FIG. 2. Since description of FIG. 2 is as described above, description herein is omitted.

Returning to FIG. 13, the recognition unit 31 recognizes a product included in a processing image. For example, the recognition unit 31 may recognize a product included in a processing image, by feature value matching based on a previously stored feature value of appearance of each of a plurality of products, similarly to the first recognition unit 21 described in the second example embodiment. Otherwise, the recognition unit 31 may recognize a product included in a processing image, based on an estimation model of recognizing a product from a product image generated by machine learning based on a product image of a product, and the processing image. For example, the processing apparatus 10 may generate the estimation model. The processing apparatus 10 generates the above-described estimation model, by machine learning based on training data associating a product image of a product with information (example: product discrimination information, a product name, and the like) discriminating the product.

The second assessment unit 32 assesses whether the product recognized by the recognition unit 31 is registered as a first processing target product requiring first processing.

For example, the storage unit 35 may store "information indicating whether each product is a first processing target product requiring first processing" generated by the processing apparatus 10. Then, the second assessment unit 32 may refer to the information, and assess whether the product recognized by the recognition unit 31 is registered as a first processing target product.

Otherwise, the second assessment unit 32 may transmit, to an external server such as a store server, discrimination information of the product recognized by the recognition unit 31, and inquire whether the product is registered as a first processing target product. In a case of this example, the external server refers to "information indicating whether each product is a first processing target product requiring first processing", and assesses whether the product recognized by the recognition unit 31 is registered as a first processing target product. Then, the external server transmits an assessment result to the second assessment unit 32.

When the recognized product is registered as a first processing target product, the execution unit 33 executes at least either one of processing of outputting, to a worker, information requesting to confirm whether a recognition result is correct or wrong, and accepting a reply thereto, and processing of displaying a candidate list including a similar product to the recognized product, and accepting a selection by a worker from the candidate list.

For example, the execution unit 33 may output, together with a recognition result (information indicating the recognized product), information requesting to confirm whether the recognition result is correct or wrong, and thereafter, accept, from a worker, an input of a reply of whether the recognition result is correct. Then, when the reply is "wrong", the execution unit 33 may further display a candidate list including a similar product to the recognized product, and accept an input of selecting a correct product from the candidate list. In this case, the execution unit 33 determines that the product selected from the candidate list is a product included in the processing image. Moreover, when the reply is "correct", the execution unit 33 determines that the product indicated by the recognition result is a product included in the processing image.

As another example, the execution unit 33 may display a candidate list including the recognized product and a similar product to the recognized product, without performing confirmation of correctness or wrongness, and accept an input of selecting a correct product from the candidate list. In this case, the execution unit 33 determines that the product selected from the candidate list is a product included in the processing image.

Note that, a similar product included in a candidate list may be a product for which a "similarity degree to a product included in a processing image" computed by recognition processing by the recognition unit 31 is equal to or more than a threshold value. Otherwise, a similar product included in a candidate list may be a product being associated with the product recognized by the recognition unit 31, in "information indicating whether each product is a first processing target product requiring first processing" generated by the processing apparatus 10. Otherwise, a similar product included in a candidate list may be both a product for which a "similarity degree to a product included in a processing image" computed by recognition processing by the recognition unit 31 is equal to or more than a threshold value, and a product being associated with the product recognized by the recognition unit 31, in "information indicating whether each product is a first processing target product requiring first processing" generated by the processing apparatus 10.

The registration unit 34 registers a product being an accounting target, based on the recognition result by the recognition unit 31, and a result of processing by the execution unit 33.

For example, when the product recognized by the recognition unit 31 is not registered as a first processing target product, the registration unit 34 registers, as an accounting target, the product recognized by the recognition unit 31. On the other hand, when the product recognized by the recognition unit 31 is registered as a first processing target product, the registration unit 34 registers, as an accounting target, the product determined by the execution unit 33, based on an input of a worker.

For example, the registration unit 34 acquires, from a product master, product information (example, a product name, a unit price, and the like) of a product to be registered as an accounting target, and registers the acquired product information. The product master may be stored by a store server, or may be stored by the accounting apparatus 30. Moreover, the registration unit 34 computes an accounting amount, based on product information of a product registered as an accounting target.

The accounting apparatus 30 may include a function of executing the settlement processing of settling an accounting amount. In the settlement processing, for example, the accounting apparatus 30 accepts insertion of cash, accepts an input of credit card information, communicates with a server of a credit card company and performs settlement processing, accepts an input of a received amount, computes a change, sends out a computed change, executes other processing such as code settlement, and issues a receipt.

Note that, when the accounting apparatus 30 does not include a function of executing the settlement processing, the settlement apparatus physically and/or logically separated from the accounting apparatus 30 executes the settlement processing. In this case, the accounting apparatus 30 transmits a computed accounting amount to the settlement apparatus.

Next, one example of a flow of registration processing by the accounting apparatus 30 is described by use of a flowchart in FIG. 14.

First, the accounting apparatus 30 acquires a processing image (S40). For example, one or a plurality of cameras are placed in a position and a direction where one or a plurality of products being accounting targets mounted on a counter are captured. For example, one or a plurality of cameras capturing a product mounted on the counter from above (immediately above, obliquely above, or the like), one or a plurality of cameras capturing a product mounted on the counter from a side, or one or a plurality of cameras capturing a product mounted on the counter from below (immediately below, obliquely below, or the like) across the counter may be placed. Then, the accounting apparatus 30 may acquire an image generated by such a camera. Note that, when one or a plurality of cameras capturing a product mounted on the counter from below (immediately below, obliquely below, or the like) across the counter are placed, the counter is made of a transparent material (glass, plastic, or the like).

As another example, one camera may be placed for one accounting apparatus 30. Then, a worker may locate products being accounting targets in front of the camera one by one, and capture the products individually. Then, the accounting apparatus 30 may acquire an image generated by such a camera.

Next, the recognition unit 31 recognizes a product included in a processing image (S41). For example, the recognition unit 31 may recognize a product included in the processing image, by feature value matching. Otherwise, the recognition unit 31 may recognize a product included in the processing image, based on an estimation model generated by machine learning based on a product image.

Next, the second assessment unit 32 assesses whether the product recognized by the recognition unit 31 is registered as a first processing target product requiring first processing (S42). This assessment is performed based on "information indicating whether each product is a first processing target product requiring first processing" generated by the processing apparatus 10.

When a first processing target product is not included in the product recognized by the recognition unit 31 (No in S43), the registration unit 34 acquires, from a product master, product information of the product recognized in S41, and registers the acquired product information as product information of an accounting target (S46).

On the other hand, when a first processing target product is included in the product recognized by the recognition unit 31 (Yes in S43), the execution unit 33 executes at least either one of processing of outputting, to a worker, information requesting to confirm whether a recognition result is correct or wrong, and accepting a reply thereto, and processing of displaying a candidate list including a similar product to the recognized product, and accepting a selection by a worker from the candidate list (S44). Then, the registration unit 34 determines a product included in the processing image, based on a recognition result in S41 and a result in S44, acquires, from a product master, product information of the determined product, and registers the acquired product information as product information of an accounting target (S45). When a plurality of products are included in the processing image, the registration unit 34 acquires, from a product master, product information (example, a product name, a unit price, and the like) of the product determined in the processing of S44, and registers the acquired product information, in a product assessed as a first processing target product. On the other hand, in a product that has not been assessed to be a first processing target product, the registration unit 34 acquires, from a product master, product information of the product recognized in S41, and registers the acquired product information.

The processing apparatus 10 and the accounting apparatus 30 according to the present example embodiment described above achieve an advantageous effect similar to that according to the first example embodiment.

Moreover, the processing apparatus 10 and the accounting apparatus 30 according to the present example embodiment can recognize a product, regarding a first processing target product, by executing at least either one of processing of outputting, to a worker, information requesting to confirm whether a recognition result is correct or wrong, and accepting a reply thereto, and processing of displaying a candidate list including a similar product to the recognized product, and accepting a selection by a worker from the candidate list. As a result, recognition accuracy of a first processing target product can be heightened.

Moreover, the processing apparatus 10 and the accounting apparatus 30 according to the present example embodiment can recognize a product, regarding a first processing target product, by performing such processing of inquiring of a worker as described above, and can recognize a product without performing the processing, regarding another product. In this way, since processing of inquiring of a worker in which a worker burden or a computer burden becomes great can be performed on only a product truly requiring the processing, recognition accuracy can be heightened without excessively increasing a worker burden or a computer burden.

Note that, in the present description, "acquisition" may include "fetching, by a local apparatus, data stored in another apparatus or a storage medium (active acquisition)", for example, receiving by requesting or inquiring of the another apparatus, accessing the another apparatus or the storage medium and reading, and the like, based on a user input, or based on an instruction of a program. Moreover, "acquisition" may include "inputting, into a local apparatus, data output from another apparatus (passive acquisition)", for example, receiving data being distributed (or transmitted, push notification, or the like), and the like, based on a user input, or based on an instruction of a program. Moreover, "acquisition" may include selecting and acquiring from received data or information, and "generating new data by editing of data (conversion into text, rearrangement of data, extraction of partial data, alteration of a file format, or the like) or the like, and acquiring the new data".

While the invention of the present application has been described above with reference to the example embodiments (and examples), the invention of the present application is not limited to the example embodiments (and examples) described above. Various modifications understandable to a person skilled in the art can be made to a configuration and details of the invention of the present application within the scope of the invention of the present application.

Some or all of the above-described example embodiments can also be described as, but are not limited to, the following supplementary notes.

1. A processing apparatus including:
  a product database management means for registering a registration target product in a product database; and
  a special information management means for, when a similar-appearance product being similar in appearance to the registration target product is registered in the product database, registering both the registration target product and the similar-appearance product as first processing target products requiring first processing, and also registering information associating the registration target product and the similar-appearance product.

2. The processing apparatus according to supplementary note 1, further including a first assessment means for assessing whether a similar-appearance product being similar in appearance to the registration target product is registered in the product database.

3. The processing apparatus according to supplementary note 2, wherein the first assessment means assesses, based on a product image, whether the similar-appearance product is registered in the product database.

4. The processing apparatus according to any one of supplementary notes 1 to 3, wherein
  the product database management means deletes a deletion target product from the product database, and
  the special information management means deletes, from the first processing target products, a product being associated with the deletion target product.

5. The processing apparatus according to supplementary note 4, wherein the special information management means deletes, from the first processing target products, a product that is associated with the deletion target product and that is not associated with another product.

6. The processing apparatus according to any one of supplementary notes 1 to 5, further including a learning means for generating an estimation model of recognizing a product from a product image, by machine learning based on a product image of the first processing target product.

7. The processing apparatus according to supplementary note 6, wherein the learning means performs machine learning based on a product image of the first processing target product, and generates the new estimation model, after at least either one of a timing at which one or a plurality of new products are registered as first processing target products, and a timing at which one or a plurality of products are deleted from the first processing target products.

8. An accounting apparatus including:
  a first recognition means for recognizing a product included in a processing image, by feature value matching based on a previously stored feature value of appearance of each of a plurality of products;
  a second assessment means for assessing whether a product recognized by the first recognition means is registered as a first processing target product requiring first processing;
  a second recognition means for recognizing a product included in the processing image, based on an estimation model of recognizing a product from a product image generated by machine learning based on a product image of the first processing target product, and the processing image, when a product recognized by the first recognition means is registered as the first processing target product;
  a determination means for determining a product included in the processing image, based on a recognition result of the first recognition means, and a recognition result of the second recognition means, when a product recognized by the first recognition means is registered as the first processing target product; and
  a registration means for registering, as an accounting target, a product determined by the determination means, when a product recognized by the first recognition means is registered as the first processing target product, and registering, as an accounting target, a product recognized by the first recognition means, when a product recognized by the first recognition means is not registered as the first processing target product.

9. An accounting apparatus including:
a recognition means for recognizing a product included in a processing image;
a second assessment means for assessing whether a product recognized by the recognition means is registered as a first processing target product requiring first processing;
an execution means for, when a recognized product is registered as the first processing target product, executing at least either one of processing of outputting, to a worker, information requesting to confirm whether a recognition result is correct or wrong, and accepting a reply, and processing of outputting, to a worker, a candidate list including a similar product to a recognized product, and accepting a selection from the candidate list; and
a registration means for registering a product being an accounting target, based on a recognition result by the recognition means, and a result of processing by the execution means.

10. A processing method including:
by a computer,
registering a registration target product in a product database; and,
when a similar-appearance product being similar in appearance to the registration target product at a predetermined level or more is registered in the product database, registering both the registration target product and the similar-appearance product as first processing target products requiring first processing, and also registering information associating the registration target product and the similar-appearance product.

11. A program causing a computer to function as
a product database management means for registering a registration target product in a product database, and
a special information management means for, when a similar-appearance product being similar in appearance to the registration target product at a predetermined level or more is registered in the product database, registering both the registration target product and the similar-appearance product as first processing target products requiring first processing, and also registering information associating the registration target product and the similar-appearance product.

What is claimed is:
1. A processing apparatus comprising:
at least one memory configured to store one or more instructions; and
at least one processor configured to execute the one or more instructions to:
register a registration target product in a product database; and
when a similar-appearance product being similar in appearance to the registration target product is registered in the product database, register both the registration target product and the similar-appearance product as first processing target products requiring first processing, and also register information associating the registration target product and the similar-appearance product.
2. The processing apparatus according to claim 1, wherein the processor is further configured to execute the one or more instructions to assess whether a similar-appearance product being similar in appearance to the registration target product is registered in the product database.
3. The processing apparatus according to claim 2, wherein the processor is further configured to execute the one or more instructions to assess, based on a product image, whether the similar-appearance product is registered in the product database.
4. The processing apparatus according to claim 1, wherein the processor is further configured to execute the one or more instructions to:
delete a deletion target product from the product database, and
delete, from the first processing target products, a product being associated with the deletion target product.
5. The processing apparatus according to claim 4, wherein the processor is further configured to execute the one or more instructions to delete, from the first processing target products, a product that is associated with the deletion target product and that is not associated with another product.
6. The processing apparatus according to claim 1, wherein the processor is further configured to execute the one or more instructions to generate an estimation model of recognizing a product from a product image, by machine learning based on a product image of the first processing target product.
7. The processing apparatus according to claim 6, wherein the processor is further configured to execute the one or more instructions to perform machine learning based on a product image of the first processing target product, and generate the new estimation model, after at least either one of a timing at which one or a plurality of new products are registered as first processing target products, and a timing at which one or a plurality of products are deleted from the first processing target products.
8. An accounting apparatus comprising:
at least one memory configured to store one or more instructions; and
at least one processor configured to execute the one or more instructions to:
recognize a product included in a processing image, by feature value matching based on a previously stored feature value of appearance of each of a plurality of products;
assess whether a product recognized by the feature value matching is registered as a first processing target product requiring first processing;
recognize a product included in the processing image, based on an estimation model of recognizing a product from a product image generated by machine learning based on a product image of the first processing target product, and the processing image, when a product recognized by the feature value matching is registered as the first processing target product;
determine a product included in the processing image, based on a recognition result of the feature value matching, and a recognition result of the estimation model, when a product recognized by the feature value matching is registered as the first processing target product; and
register, as an accounting target, a product determined based on the recognition result of the feature value matching, and the recognition result of the estimation model, when a product recognized by the feature value matching is registered as the first processing target product, and register, as an accounting target, a product recognized by the feature value matching, when a product recognized by the feature value matching is not registered as the first processing target product.

9. An accounting apparatus comprising:

at least one memory configured to store one or more instructions; and at least one processor configured to execute the one or more instructions to:

recognize a product included in a processing image;

assess whether a recognized product is registered as a first processing target product requiring first processing;

when the recognized product is registered as the first processing target product, execute at least either one of processing of outputting, to a worker, information requesting to confirm whether a recognition result is correct or wrong, and accepting a reply, and processing of outputting, to a worker, a candidate list including a similar product to a recognized product, and accepting a selection from the candidate list; and register a product being an accounting target, based on a product recognition result, and a result of the reply or the selection.

* * * * *